(12) United States Patent
Chatterton et al.

(10) Patent No.: US 8,315,744 B2
(45) Date of Patent: Nov. 20, 2012

(54) DISTRIBUTING POWER TO NETWORKED DEVICES

(75) Inventors: Deon J. Chatterton, Livermore, CA (US); Shmuel Shaffer, Palo Alto, CA (US); Morrill William Jacobs, Bonsall, CA (US)

(73) Assignee: Cisco Technology, Inc., San Jose, CA (US)

( * ) Notice: Subject to any disclaimer, the term of this patent is extended or adjusted under 35 U.S.C. 154(b) by 149 days.

(21) Appl. No.: 12/262,746

(22) Filed: Oct. 31, 2008

(65) Prior Publication Data

US 2010/0114389 A1    May 6, 2010

(51) Int. Cl.
   *G05D 11/00* (2006.01)
(52) U.S. Cl. ............................ 700/295; 700/22; 700/291
(58) Field of Classification Search .................. 700/22, 700/23, 286, 291, 295
   See application file for complete search history.

(56) References Cited

U.S. PATENT DOCUMENTS

| | | | |
|---|---|---|---|
| 7,613,549 B1* | 11/2009 | Motoyama | 700/295 |
| 7,756,544 B1* | 7/2010 | Graham | 455/522 |
| 2004/0002792 A1* | 1/2004 | Hoffknecht | 700/295 |
| 2004/0153170 A1* | 8/2004 | Santacatterina et al. | 700/1 |
| 2006/0190139 A1* | 8/2006 | Reaume et al. | 700/291 |
| 2007/0024125 A1* | 2/2007 | Biskup et al. | 307/116 |
| 2009/0014516 A1* | 1/2009 | Kshirsagar et al. | 235/382.5 |
| 2009/0149973 A1* | 6/2009 | Keller et al. | 700/90 |

* cited by examiner

*Primary Examiner* — Mohammad Ali
*Assistant Examiner* — Nathan Laughlin
(74) *Attorney, Agent, or Firm* — Schwegman, Lundberg & Woessner, P.A.

(57) ABSTRACT

A method and an apparatus to distribute power to a networked apparatus are provided. The apparatus may comprise a communication module to receive sensor data via a communication network connected to a plurality of sensors operatively located within a building. The plurality of sensors may be to provide sensor data identifying a presence of one or more persons in the building. The apparatus includes a policy engine including a plurality of rules, each rule associated with at least one powered device located within the building. A power control module is configured to adjust power supplied to the at least one powered device based on the rule. Power to the powered devices may be provided over a power over Ethernet network.

29 Claims, 4 Drawing Sheets

DISTRIBUTING POWER TO NETWORKED DEVICES

FIELD

The present disclosure relates generally to powered devices connected to a communication network.

BACKGROUND

Electronic devices consume power in their standby mode of operation so as to be available almost instantly when users want to use them. With the proliferation of these electronic devices, the standby power consumed by each device multiplied by, for example, the number of devices per business or household multiplied by the number of businesses or households results in a relatively large amount of energy being consumed. These devices typically remain in their standby mode even when it is highly unlikely that they will be used, for example, when an employee leaves the office after a days work, residents leave their home to go to work, and so on. Thus, in aggregate electronic devices in their standby mode of operation waste a large amount of energy.

BRIEF DESCRIPTION OF DRAWINGS

Embodiments are illustrated by way of example, and not limitation, in the figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail.

Overview

A method and an apparatus to distribute power to a networked apparatus are provided. The apparatus may comprise a communication module to receive sensor data via a communication network connected to a plurality of sensors operatively located within a building. The plurality of sensors may be to provide sensor data identifying the presence of one or more persons in the building. The apparatus includes a policy engine including a plurality of rules, each rule associated with at least one powered device located within the building. A power control module is configured to adjust power supplied to the at least one powered device based on the rule. Power to the powered devices may be provided over a power over Ethernet network.

Example Embodiments

Figure 1:
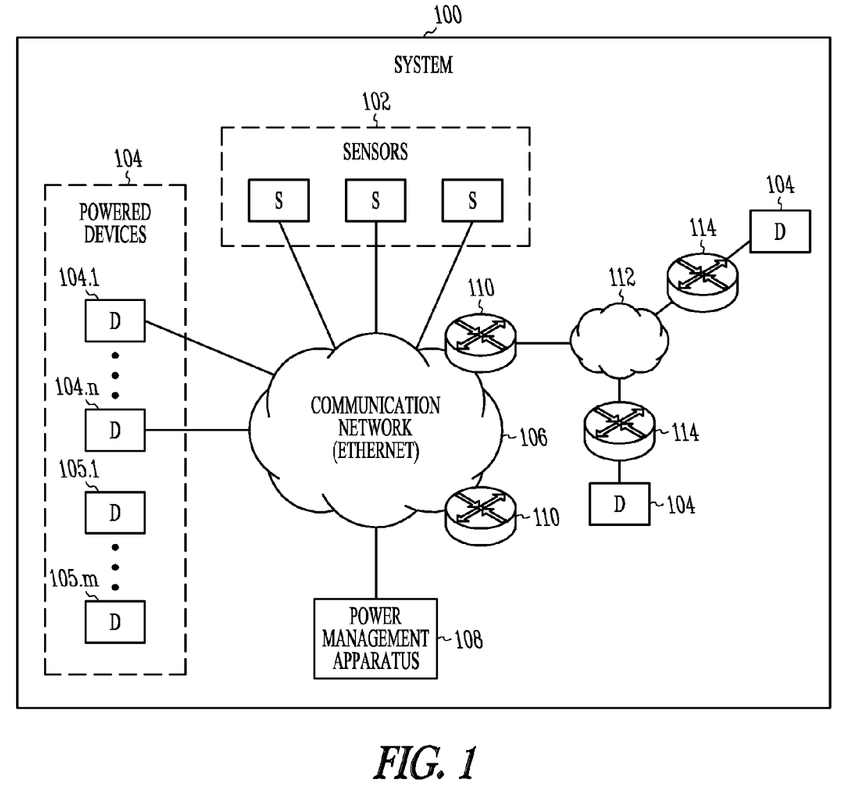
FIG. 1 depicts a simplified diagram of system, in accordance with an example embodiment, to distribute power in a building.

Referring to the drawings, FIG. 1 depicts a simplified diagram of a system 100, in accordance with an example embodiment. The system 100 is shown to include a plurality of sensors 102, a plurality of powered devices 104 including voice over IP (VoIP) telephones 104.1-104.$n$, a communication network 106, and a power management apparatus 108. In use, the power management apparatus 108 is configured to control or regulate power supplied to the plurality of powered devices 104. Further powered devices 105.1-105.$m$ may be provided in addition to, or instead of, the VoIP telephones 104.1-104.$n$. For example, the powered devices 105.1-105.$m$ may include an access card reader, a video camera, an access badge reader, a temperature sensor, a door lock, a motion sensor, a wireless network device, an IP line-card, or any other network device connectable to the communication network 106.

In an example embodiment, the communication network 106 is an Ethernet network that may provide power via a power over Ethernet (PoE) network. Further, in an example embodiment, the communication network 106 includes a plurality of routers 110 (only two of which are shown by way of example in FIG. 1) and a subnet 112 including, for example, one or more switches 114. In an example embodiment, the system 100 may be deployed in a building (e.g., see FIG. 3) and monitor the presence of persons within the building to provide sensor data (e.g., via the sensors 102) to the power management apparatus 108 via the communication network 106. As described by way of example in more detail below, the power management apparatus 108 may process the sensor data based on rules and, in response thereto, adjust the power (e.g., reduce or switch off) the power provided to the powered devices 104.

Figure 2:
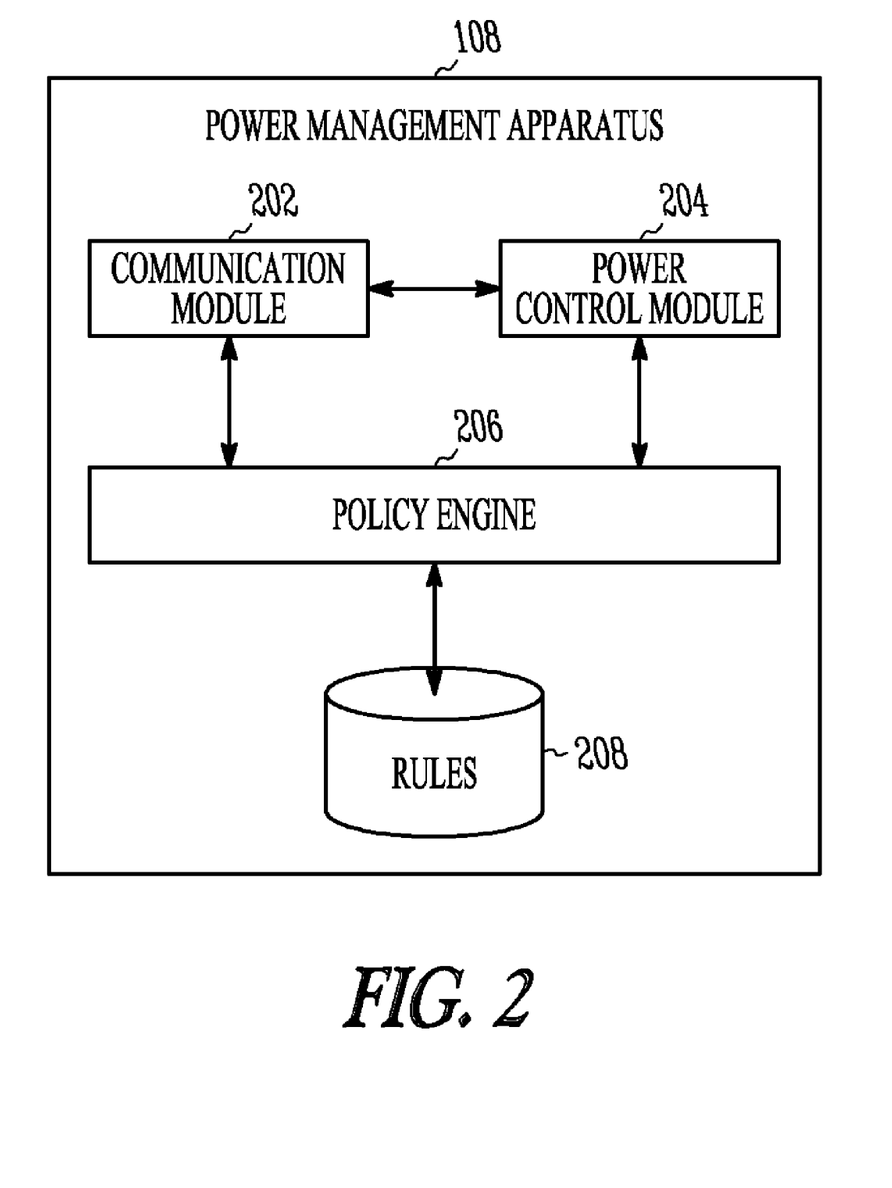
FIG. 2 depicts a simplified block diagram of an apparatus, in accordance with an example embodiment, to manage power in a building.

FIG. 2 depicts a simplified block diagram of a power management apparatus 108, in accordance with an example embodiment, to manage power in a building. The power management apparatus 108 is shown to include a communication module 202, a power control module 204, a policy engine 206, and a rules database 208. The communication module 202 is configured to interface with the communication network 106 of FIG. 1 and, in an example embodiment, power is provided via PoE to the powered devices 104. Accordingly, in an example embodiment, the power control module 204 may be configured to control power that is distributed to the powered devices via a PoE network.

The policy engine 206 may, for example, be hardware or software that selects a particular power policy based on the sensor data received from the sensors 102. Each policy may include one or more rules stored in the rules database 208. For example, the rules may identify which powered devices 104 are to be powered up into a standby mode when a particular person enters a building, which powered devices 104 are maintained in their standby mode so as to be available for emergency services, and so on.

Figure 3:
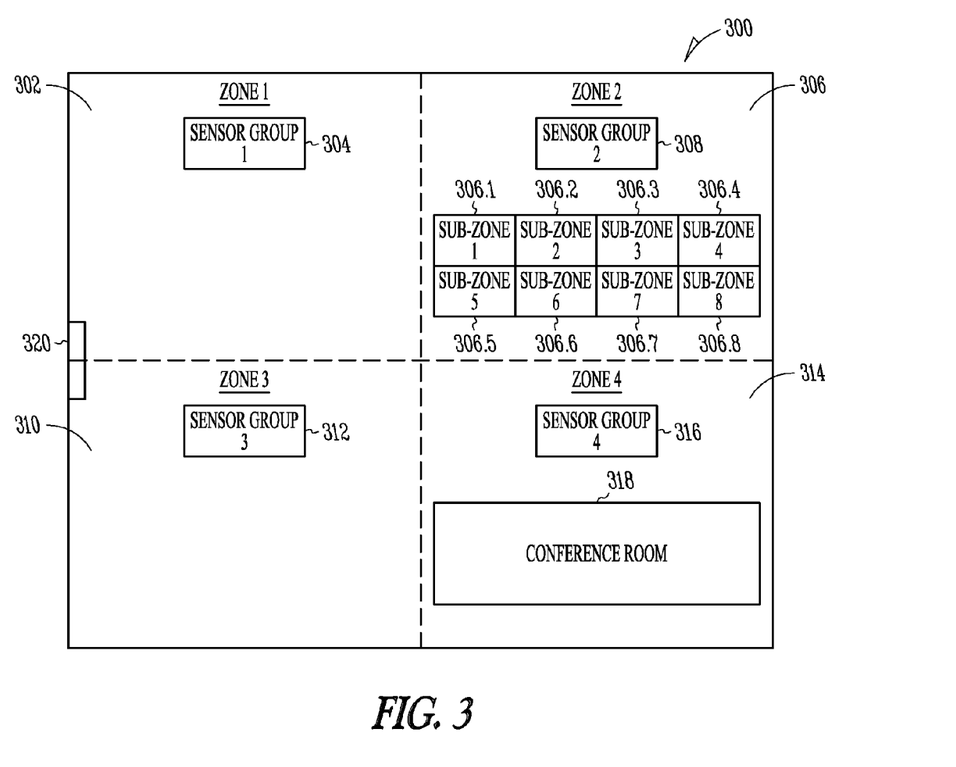
FIG. 3 depicts a schematic view of a building, in accordance with an example embodiment, including a plurality of zones in which power may be managed using the system of FIG. 1.

FIG. 3 depicts a schematic view of a building 300, in accordance with an example embodiment, including a plurality of zones in which power may be managed using the system 100 of FIG. 1. It will be appreciated that a variety of different sensors 102 may be mounted at different locations within the building 300. In use, data from the sensors 102 may be processed by the power management apparatus 108 to switch off power (or at least reduce power) provided to the powered devices 104 so that power normally used by the powered devices 104 in their standby mode is conserved. It will be appreciated that, in aggregate, reducing or eliminating powered consumption by a relatively large number of powered devices 104 in their standby mode may result in an appreciable saving of electrical power which would otherwise be wasted.

The building 300 may be divided up into a plurality of zones. The example building 300 is shown to include four zones. A first zone 302 is shown to include a sensor group 304. Sensor group 304 may include, for example, a motion sensor to detect the presence of people in the first zone 302, a surveillance camera to detect and, optionally, identify persons in the first zone 302, a power sensor to sense power consumed by the powered devices 104 in the first zone 302, and so on. Likewise, a second zone 306 with an associated sensor group 308, a third zone 310 with an associated sensor group 312, and a fourth zone 314, with an associated sensor group 316 may be provided. It will be appreciated that any number of zones may be provided and that the zones may be arranged in different places within a building (or series of buildings). Further, different zones may be provided on different floors within a building. In an example embodiment, different zones may be used for different functions. For example, the second zone 306 may be used to provide office space to employees. Accordingly, the second zone 306 is shown, by way of example, to include sub-zones 306.1-306.8. Each of the sub-zones 306.1-306.8 may be a cube or office for an individual employee.

Accordingly, each sub-zone 306.1-306.8 may include a plurality of powered devices 104. For example, one or more of the sub-zones 306.1-306.8 may include a VoIP telephone 104.1, a computer, or the like. The communication network 106 may provide power to the VoIP telephone 104.1 and, accordingly, the power management apparatus 108 may then be used to manage power consumption of the VoIP telephone 104.1 and other powered devices 104 in each of the sub-zones 306.1-306.8. When an employee is not present or using the powered devices in an associated sub-zone 306.1-306.8, the power control module 204 may access a particular rule in the rules database 208 and implement the rule. For example, the rule may state that all power supplied to the powered devices 104 in the sub-zone 306.1-306.8 is at least reduced or, in certain example embodiments, completely shut off thereby to conserve power.

The sensor group 308 may comprise a plurality of different sensors located in different locations in the second zone 306. For example, each sub-zone 306.1-306.8 may include a sensor to identify when a particular employee is present in his or her cubicle or office. In response to sensor data from a sensor located in the sub-zone 306.1-306.8, the power management apparatus 108 may then control power in the particular sub-zone 306.1-306.8.

In an example embodiment, the sensor group 308 may include a sensor to generally detect the presence of persons in the second zone 306. For example, when the presence of a person in the second zone 306 is detected, the power management apparatus 108 may power ceiling lights in the second zone 306 to provide light in the entire second zone 306. However, if the presence of persons is not detected in the second zone 306, the power management apparatus 108 may reduce or switch off power supplied to lighting equipment in the second zone 306.

The example fourth zone 314 is shown to include a conference room 318. In an example embodiment, when the presence of people is not detected in the conference room 318, the power management apparatus 108 may switch off lights in the conference room, reduce or remove power supplied to powered devices 104 such as telephones provided in the conference room 318, or the like. Thus, in an example embodiment, the power management apparatus 108 may control power to various loads within a building 300. The power supplied to the various loads may be power supplied over Ethernet or power supplied by a building power reticulation network.

In an example embodiment, a sensor 102 may be provided to sense power consumed by a powered device 104. For example, sensor data from the sensor 102 may identify that no power, or very little power, is consumed by a load (e.g., a powered devices such as a personal computer) connected to the communication network 106. For example, when the personal computer has been in a standby mode for a prolonged period of time, the power management apparatus 108 may then infer that the user is no longer in a workspace and switch off power to the personal computer. In a related embodiment, the sensing of the power consumption of the powered device 104 may be obtained from a power supply rather than from a dedicated sensor. In yet another embodiment, the sensing of the presence of a person on premises may be obtained via information from a badge reader that the user is expected to present to a badge management system (not shown) upon entry or exit from the premises.

In yet another example embodiment, the presence of a person in a building may be obtained from a security system that acts as a sensor for detecting presence. For example, when a person leaves his or her residence and arms a home security system in an "Away" state, the home security system may act as a presence sensor and notify the policy engine that the users have left the home and the system should transition to a "No user at home" state in which reduced power (or no power) is provided to one or more powered devices in the home.

Those who are skilled in the art would recognize that the above examples are provided merely by way of example and should not be considered as limiting. Other presence detection methods and devices are used in different example embodiments.

Figure 4:
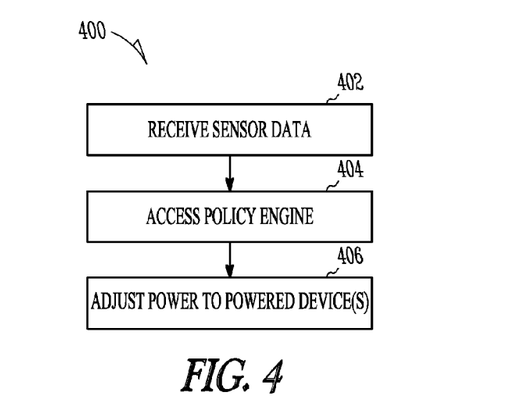
FIG. 4 depicts a flow diagram of a general overview of a method, in accordance with an example embodiment, for managing power in a building.

FIG. 4 depicts a flow diagram of a general overview of a method 400, in accordance with an example embodiment, for managing power in a building. Method 400 may be performed by the power management apparatus 108 and, accordingly, is described by way of example with reference thereto.

As shown at block 402, the method 400 may include receiving sensor data via the communication network 106 connected to the plurality of sensors 102 located within the building 300. The sensors 102 may provide sensor data identifying the presence of one or more persons in the building 300, and/or within a zone 302, 306, 310 and 314 or sub-zone 306.1-306.8 of the building 300. Thereafter, as shown at block 404, the method 400 may access a policy engine, for example, the policy engine 206 shown in FIG. 2. The policy engine 206 may identify at least one of a plurality of rules associated with the sensor data wherein each rule of the plurality of rules is associated with at least one powered device 104 located within the building 300. For example, when the method 400 is deployed in the building 300 to manage power in a sub-zone 306.1-306.8, the policy engine 206 may apply a particular rule associated with the sub-zone 306.1-306.8. For example, the rule may stipulate that when a sensor 308 detects the presence of a person by in the sub-zone 306.1-306.8, the power control module 204 enables the provision of power over Ethernet to a VoIP telephone within the sub-zone 306.1-306.8.

Accordingly, as shown at block 406, the method 400 may adjust power to one or more powered devices 104 based on the sensor data and one or more rules. In an example embodiment, the rules may relate to one or more powered devices and/or zones within the building 300. For example, a rule relating to a zone may, for example, include powering lighting equipment within a particular zone within a building when the presence of people is detected generally within the given zone. However, for example, power supplied to a particular sub-zone 306.1-306.8 may depend upon the presence of a person within the particular sub-zone 106.1-106.8 and, in an example embodiment, the presence of a particular person authorized to be within or allocated to the sub-zone 306.1-306.8. For example, sensor data may thus include the identity of a person and, based on the identity of the person, one or more zones 302, 306, 310, and 314 and/or sub-zones 306.1-306.8 may be powered based on a rule in the rules database 208. In an example embodiment, a sensor may detect when a person has exited the building and a rule in the rules database 208 may then result in all powered devices in the building 300 associated with that person being switched off and not maintained in a standby mode.

In an example embodiment, the power management apparatus 108 may dynamically distribute or control the distribution of power within the building 300 based on rules. The rules may be stored in the rules database 208 and may be dependent upon user credentials, a priority associated with one or more powered devices 104, time, the presence of persons sensed by sensors, and/or the like. In an example embodiment, the rules database 208 comprises at least one high priority rule associated with a high priority event. For example, the high priority event may be a fire within the building 300. Accordingly, when a fire is detected, the supply of power to door locking devices (e.g., at an access door 320 and any emergency exits to the building 300) may be prioritized over power provided to, for example, computer systems. Likewise, upon the detection of a high priority event, power to an alarm system within a zone 302, 306, 310, and 314 or sub-zone 306.1-306.8 of the building 300, the VoIP telephones 104.1, or the like may be given a high priority.

In an example embodiment, a database (e.g., the rules database 208) may be used to store historical data identifying past power consumption of the power devices 104 associated with at least one rule. In these example circumstances, the policy engine 206 may include a prediction engine to predict power consumption by the plurality of powered devices 104 based on current sensor data. The power consumed within the building 300 may also be communicated to a power utility provider thereby to inform the power utility provider of expected power requirements from the particular building 300 for a particular time period.

In an example embodiment, the policy engine 206 may predict the future state of a powered device 104. For example, when the powered device 104 is an automatic door providing access to a building (e.g., see the access door 320), or a particular zone with the building 300, one or more sensors 102 located proximate the access door 320 may detect multiple persons approaching the door and a rule within the rules database 208 may stipulate that the access door 320 is kept open for a sufficient duration to allow the persons to enter the building 300. In an example embodiment, policy engine 206 may include a rule that stipulates that, when the access door 320 is about to close and a sensor 102 detects a second person with the requisite access rights is heading towards the access door 320, the access door 320 is kept open.

Thus, power may be conserved as the access door 320 is not opened and closed multiple times. In an example embodiment, one or more sensors 102 may be configured to identify the persons to ensure that the persons have the requisite authority to enter the building 300. Likewise, similar sensors may be placed at other doors within the building to control access to selected zones within the building 300.

In an example embodiment, the power management apparatus 108 may include rules stipulating a sequence in which sub-zones 306.1-306.8, are to be occupied by persons. Accordingly, based on sensor data, one or more of the sub-zones 306.1-306.8 may be powered up and a communication (e.g., an email message, an audio announcement over a speaker system, a display screen or the like) may be sent to a person directing them to a particular sub-zones 306.1-306.8 which is, or has been, powered up. For example, one of the sensors 102 may be located at the access door 320 and, based on sensor data from that sensor and rules provided in the rules database 208, selected zones or sub-zones within the building 300 may be powered up. The person may then, optionally, be directed to a particular zone 306.1-306.8 that has powered up or will be powered shortly (e.g., into a standby mode).

It will be appreciated that the power management apparatus 108 may control any electrical load within the building 300. For example, the electrical load may be an air conditioning system, heating system, lighting system, appliances in a kitchen, or the like. Thus the power management apparatus 108 may control the provision of power via a PoE network and/or a dedicated power reticulation network in the building 300.

Figure 5:
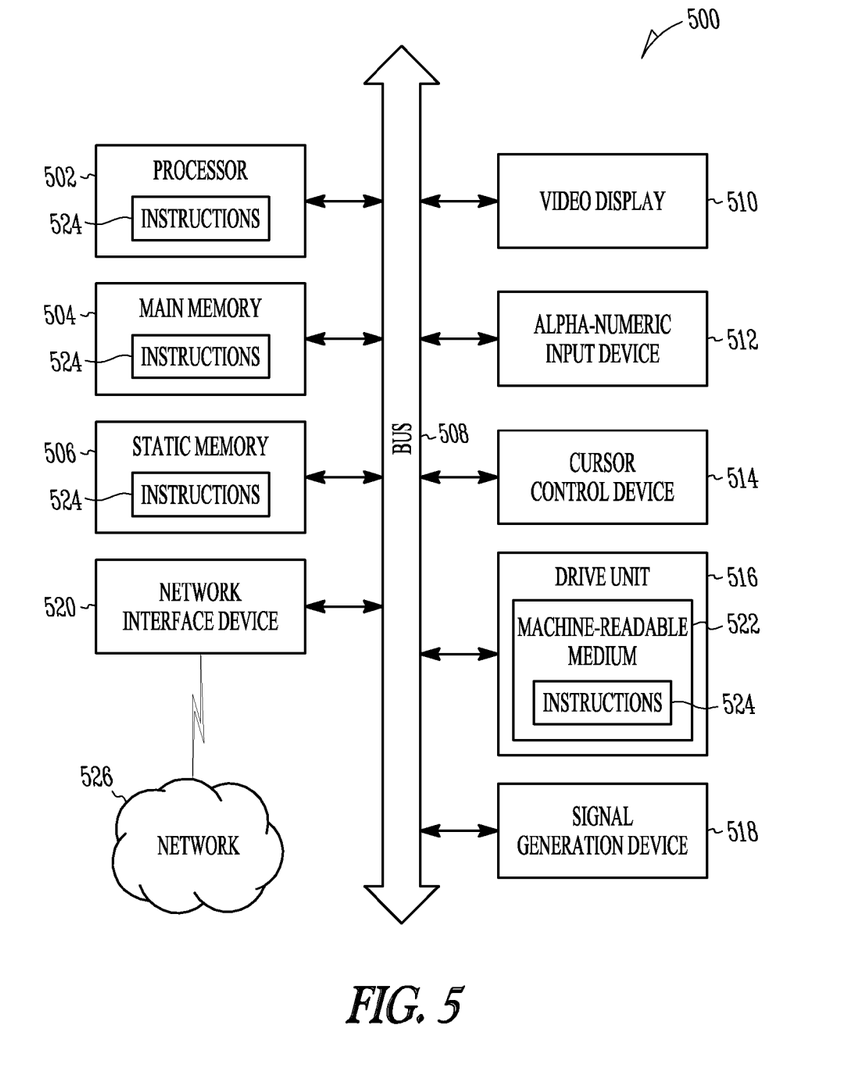
FIG. 5 is a simplified block diagram of a machine in the example form of a computing system within which a set of instructions, for causing the machine to perform any one or more of the methodologies discussed herein, may be executed.

FIG. 5 is a simplified block diagram of a machine in the example form of a computing system within which a set of instructions, for causing the machine to perform any one or more of the methodologies discussed herein, may be executed. In alternative embodiments, the machine may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computing system 500 includes processor 502 (e.g., a central processing unit (CPU), a graphics processing unit (GPU) or both), main memory 504 and static memory 506, which communicate with each other via bus 508. Computing system 500 may further include video display unit 510 (e.g., a plasma display, a liquid crystal display (LCD) or a cathode ray tube (CRT)). Computing system 500 also includes alphanumeric input device 512 (e.g., a keyboard), user interface (UI) navigation device 514 (e.g., a mouse), disk drive unit 516, signal generation device 518 (e.g., a speaker) and network interface device 520.

Disk drive unit 516 includes machine-readable medium 522 on which is stored one or more sets of instructions and data structures (e.g., software 524) embodying or utilized by any one or more of the methodologies or functions described herein. Software 524 may also reside, completely or at least partially, within main memory 504 and/or within processor 502 during execution thereof by computing system 500, with main memory 504 and processor 502 also constituting machine-readable, tangible media. Software 524 may further be transmitted or received over network 526 via network interface device 520 utilizing any one of a number of well-known transfer protocols (e.g., Hypertext Transfer Protocol (HTTP)).

While machine-readable medium 522 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, and solid-state memories, optical and magnetic media.

While the invention(s) is (are) described with reference to various implementations and exploitations, it will be understood that these embodiments are illustrative and that the scope of the invention(s) is not limited to them. In general, techniques for embedding priorities in multimedia streams may be implemented with facilities consistent with any hardware system(s) defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. An apparatus comprising at least one processor and memory to store instructions which, when executed by the at least one processor, perform operations for:
   a communication module to receive sensor data via a communication network connected to a plurality of sensors operatively located within a building, the plurality of sensors being to provide sensor data identifying the presence of one or more persons in a building, and the communication module further operating to send information via a communication device to the one or more persons in the building;
   a policy engine including a plurality of rules, each rule associated with at least one powered device located within the building, at least one rule further including operations to select an available zone in the building for operating powered devices by the one or more persons in the building, the available zone being selected from a plurality of zones in the building to reduce power consumption in one or more zones that are unoccupied, and the at least one rule further including related information to be sent to the one or more persons in the building, the related information including an identification of the available zone in the building for operating powered devices; and
   a power control module to adjust power supplied to the at least one powered device based on the rule.

2. The apparatus of claim 1, wherein the plurality of sensors comprise an access card sensor, a video surveillance camera, a temperature sensor, a power consumption sensor, or a motion sensor.

3. The apparatus of claim 1, wherein the sensor data identifies power consumed by a load connected to the communication network, and the policy engine uses the identified power consumed to identify the available zone in the building for operating powered devices, the available zone being identified as powered up and available for the one or more persons in the building.

4. The apparatus of claim 1, wherein the at least one powered device comprise a telephone, a local area network (LAN) endpoint, a network camera, a network switch, or a network router.

5. The apparatus of claim 1, wherein the policy engine comprises at least one high priority rule associated with a high priority event, wherein when the high priority event is active, supply of power to the at least on powered device associated with a high priority rule is favored.

6. The apparatus of claim 1, wherein the policy engine is configured to identify a distribution of a plurality of persons within the building, and implement a rule associated with the distribution.

7. The apparatus of claim 6, wherein the rule specifies the provision of power to at least areas of the building where persons are identified.

8. The apparatus of claim 1 wherein the power control module is configured to at least reduce power supplied to the at least one powered device based on the rule associated with the at least one powered device.

9. The apparatus of claim 1, wherein the policy engine comprises at least one rule associated with a zone within the building, the rule associated with the zone specifying that all powered devices within the zone be powered when a person associated with the zone is sensed.

10. The apparatus of claim 1, wherein the communication module is configured to provide power over Ethernet (PoE) and transmit data to a plurality of powered devices, the power control module being configured to adjust power supplied via the PoE network.

11. The apparatus of claim 1, wherein the power control module is configured to at least reduce power supplied to the at least one powered device based via a building power reticulation network.

12. The apparatus of claim 1, further comprising:
   a database to store historical data identifying past power consumption of a plurality of powered devices associated with the at least one rule; and
   a prediction engine to predict future power consumption by the plurality of powered devices.

13. The apparatus of claim 12, comprising a reporting module to report the predicted future power consumption to a power utility provider.

14. A system comprising:
   a plurality of powered devices located within a building;
   a plurality of sensors to provide sensor data identifying a presence of one or more persons in the building;

a communication network connected to the plurality of sensors; and a power management module connected to the communication network, the power management module being configured receive the sensor data and to adjust power provided to the plurality of powered devices based on at least one rule associated with the sensor data, the power management module being further configured to select an available zone in the building for operating powered devices by the one or more persons in the building, the available zone being selected from a plurality of zones in the building to reduce power consumption in one or more zones that are unoccupied, and the power management module being further configured to access related information to be sent to the one or more persons in the building, the related information including an identification of the available zone in the building for operating powered devices; and a communication device to send the related information to the one or more persons in the building.

15. The system of claim 14, wherein the communication network is a PoE network configured to provide electrical power and transmit data to a plurality of powered devices.

16. The system of claim 14, wherein the power management module is configured to at least reduce power supplied to the at least one powered device based the associated rule.

17. A method comprising:

receiving sensor data via a communication network connected to a plurality of sensors located within a building, the plurality of sensors being to provide sensor data identifying the presence of one or more persons in the building;

accessing a policy engine to identify at least one of a plurality of rules associated with the sensor data, each rule of the plurality of rules being associated with at least one powered device located within the building, the policy engine further operating to select an available zone in the building for operating powered devices by the one or more persons in the building, the available zone being selected from a plurality of zones in the building to reduce power consumption in one or more zones that are unoccupied, and the policy engine further identifying related information to be sent to the one or more persons in the building, the related information including an identification of the available zone in the building for operating powered devices;

adjusting power supplied to the at least one powered device based on the identified rule; and sending the related information via a communication device to the one or more persons in the building.

18. The method of claim 17, wherein the communication network is a PoE network configured to provide electrical power and transmit data to a plurality of powered devices.

19. An apparatus comprising:

at least one processor; and memory to store instructions which, when executed by the at least one processor, perform the operations of:

receiving sensor data via a communication network connected to a plurality of sensors located within a building, the plurality of sensors being to provide sensor data identifying a presence of one or more persons in the building;

accessing a policy engine to identify at least one of a plurality of rules associated with the sensor data, each rule of the plurality of rules being associated with at least one powered device located within the building, the policy engine further operating to select an available zone in the building for operating powered devices by the one or more persons in the building, the available zone being selected from a plurality of zones in the building to reduce power consumption in one or more zones that are unoccupied, and the policy engine further identifying related information to be sent to the one or more persons in the building, the related information including an identification of the available zone in the building for operating powered devices;

adjusting power supplied to the at least one powered device based on the at least one rule; and sending the related information via a communication device to the one or more persons in the building.

20. An apparatus comprising:

a communication module for receiving sensor data via a communication network connected to a plurality of sensors located within a building, the plurality of sensors being to provide sensor data identifying a presence of one or more persons in the building, and the communication module further operating to send information via a communication device to the one or more persons in the building;

means for accessing a policy engine to identify at least one of a plurality of rules associated with the sensor data, each rule of the plurality of rules being associated with at least one powered device located within the building, at least one rule further including operations to select an available zone in the building for operating powered devices by the one or more persons in the building, the available zone being selected from a plurality of zones in the building to reduce power consumption in one or more zones that are unoccupied, and the at least one rule further including related information to be sent to the one or more persons in the building, the related information including an identification of the available zone in the building for operating powered devices; and means for adjusting power supplied to the at least one powered device based on the at least one rule.

21. The apparatus of claim 1, wherein the related information to be sent to the one or more persons in the building includes instructions directing the one or more persons to the available zone.

22. The apparatus of claim 1, wherein communication device sends information to the one or more persons in the building through at least one of an email message, a speaker system or a display screen.

23. The method of claim 17, wherein the related information to be sent to the one or more persons in the building includes instructions directing the one or more persons to the available zone.

24. The method of claim 17, wherein communication device sends information to the one or more persons in the building through at least one of an email message, a speaker system or a display screen.

25. The apparatus of claim 1, wherein the at least one rule further includes powering on at least one device in the available zone in coordination with sending the identification of the available zone to the one or more persons in the building.

26. The apparatus of claim 1, wherein the at least one rule further includes powering on at least one device in the available zone when a person who was sent the identification of the available zone is sensed in a vicinity of the available zone.

27. The apparatus of claim 1, wherein the available zone is selected from a specified sequence of zones that correspond to portions of the building so that zones are occupied in an order according to the specified sequence and power consumption is reduced in the one or more zones that are unoccupied.

28. The apparatus of claim 1, wherein a first rule included in the policy engine operates a first device by using sensor data to predict future states of the first device so that the first device is maintained in an operational configuration when a first person with access rights to the first device is near the first device.

29. The apparatus of claim 1, wherein the policy engine implements the at least one rule by performing operations including:

identifying a sequence of the zones for powering up the zones and for occupying the zones to reduce power consumption in one or more zones that are unoccupied;

selecting the available zone as a next zone from the sequence with an availability for the one or more persons in the building;

sending the related information including the identification of the available zone to the one or more persons in the building; and powering up the available zone for operating powered devices by the one or more persons in the building.

* * * * *

UNITED STATES PATENT AND TRADEMARK OFFICE
CERTIFICATE OF CORRECTION

PATENT NO. : 8,315,744 B2  
APPLICATION NO. : 12/262746  
DATED : November 20, 2012  
INVENTOR(S) : Chatterton et al.

Page 1 of 1

It is certified that error appears in the above-identified patent and that said Letters Patent is hereby corrected as shown below:

In column 8, line 37, in Claim 8, after "1", insert --,--, therefor

Signed and Sealed this
Second Day of April, 2013

Teresa Stanek Rea
*Acting Director of the United States Patent and Trademark Office*